F. NEWTON.
BALING PRESS.
APPLICATION FILED MAY 7, 1910.

982,627.

Patented Jan. 24, 1911.

2 SHEETS—SHEET 1.

Witnesses
Eugene M. Sliney
C. C. Hines

Inventor
Fred Newton.
By Victor J. Evans
Attorney

F. NEWTON.
BALING PRESS.
APPLICATION FILED MAY 7, 1910.
982,627.
Patented Jan. 24, 1911.
2 SHEETS—SHEET 2.
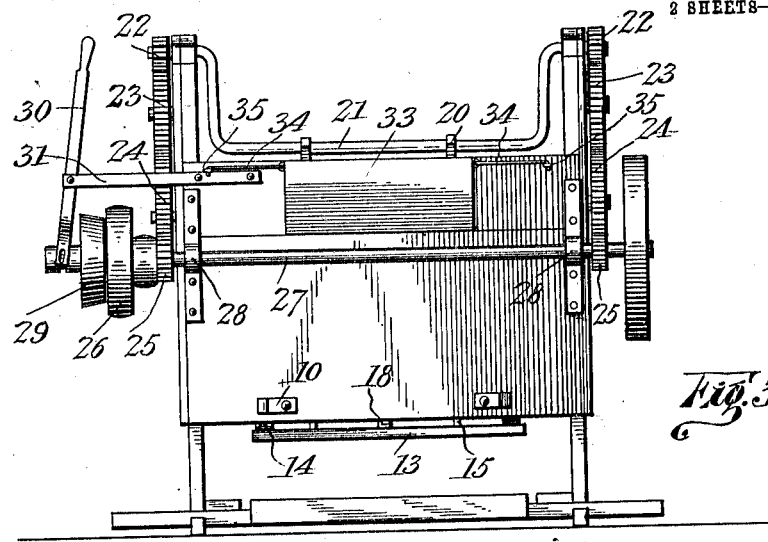
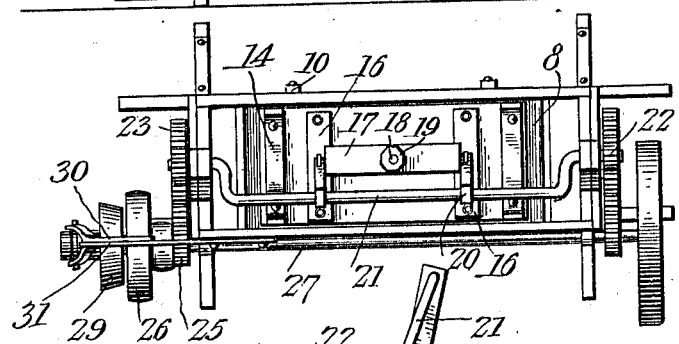
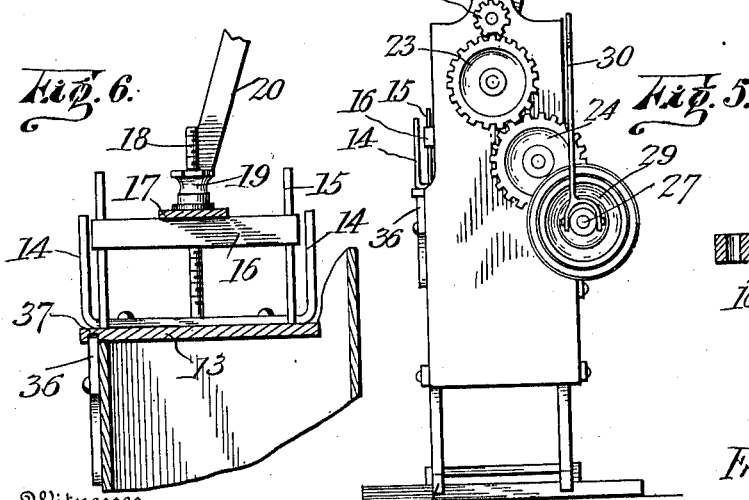
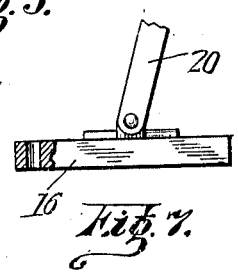
Inventor
Fred Newton.
Witnesses
Eugene M. Sliney
C. C. Hines
By Victor J. Evans
Attorney

UNITED STATES PATENT OFFICE.

FRED NEWTON, OF HUBBARD, OREGON.

BALING-PRESS.

982,627. Specification of Letters Patent. Patented Jan. 24, 1911.

Application filed May 7, 1910. Serial No. 559,929.

*To all whom it may concern:*

Be it known that I, FRED NEWTON, a citizen of the United States, residing at Hubbard, in the county of Marion and State of Oregon, have invented new and useful Improvements in Baling-Presses, of which the following is a specification.

This invention relates to a press for baling hops, hay and other like substances, the object of the invention being to provide a press especially adapted for baling hops and by means of which bales of any desired thickness and density may be readily and conveniently formed.

A further object of the invention is to provide a press which may be rapidly and economically operated.

The invention consists in the features of construction, combination and arrangement of parts hereinafter fully described and claimed, reference being had to the accompanying drawing, in which:—

Figure 1:
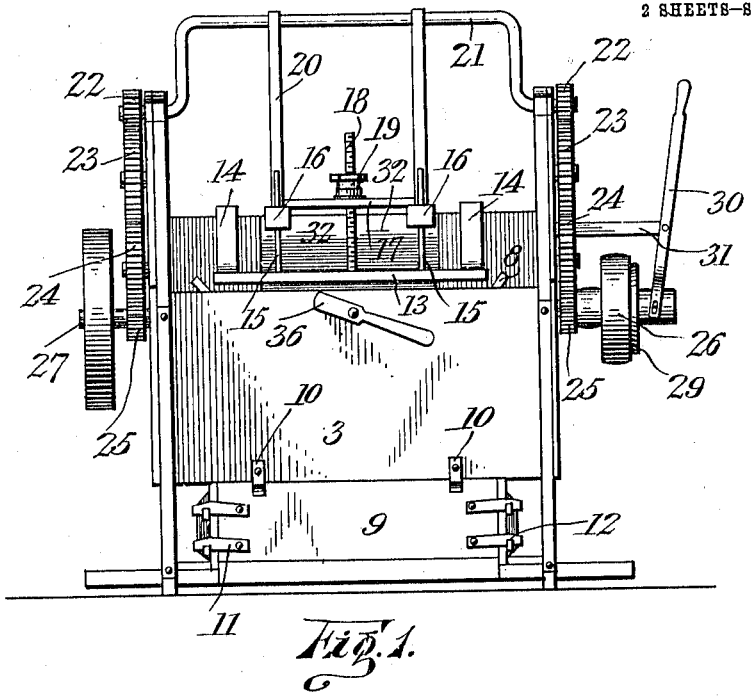
Figure 2:
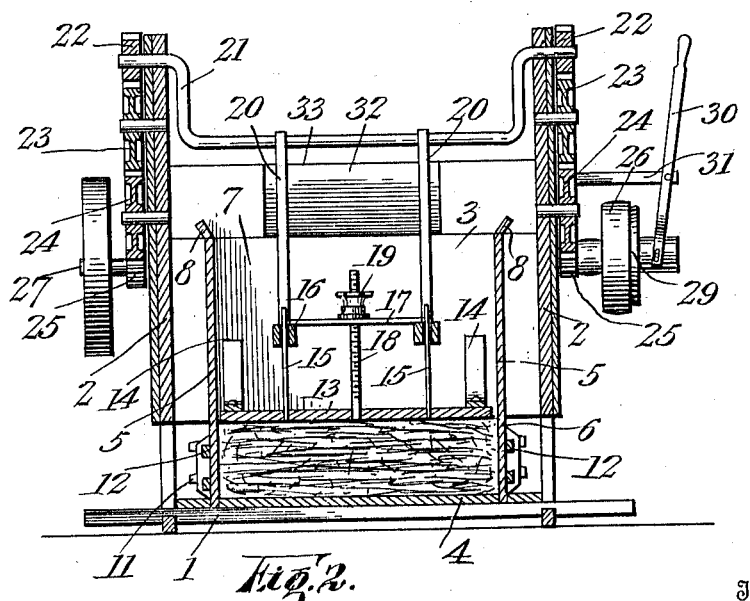

Figure 1 is a side elevation of a baling press embodying my invention, showing the plunger at the limit of its upward movement. Fig. 2 is a vertical, longitudinal section, showing the plunger at the limit of its downward movement. Fig. 3 is an opposite side elevation from that shown in Fig. 1. Fig. 4 is a top plan view of the press. Fig. 5 is an end elevation thereof. Fig. 6 is a vertical cross section through the hopper and the elevated plunger. Fig. 7 is a view, showing a detail of construction of the plunger.

The frame of the apparatus includes a base 1, upright end pieces 2, and side pieces 3, which are suitably united together. On the base 1 is disposed a board or plate 4 which forms a part of the frame structure and serves as the bottom of the baling chamber, which latter is formed in part by vertical transverse walls 5, rising from the base and secured to the walls 3, so as to form both the end walls of the baling chamber 6 and the end walls of a superposed hopper 7, the upper ends of said walls 5 being extended outwardly at an angle as at 8 to facilitate the entrance of the plunger into the hopper. The walls 2 and 3 terminate above the board 4 to leave the baling chamber normally open at its sides. These open sides of the baling chamber are adapted to be closed by doors or removable side sections 9, which are adapted to be engaged by turn buttons 10 on the walls 3 and are provided at their ends with pivoted latches 11 adapted to engage the ends of the keeper bars or members 12 mounted upon the walls 6. When the doors or removable sections are applied, the baling chamber is completely closed against access except through the hopper, with which it communicates, as shown in Fig. 2.

Mounted for vertical reciprocating movement within the hopper is a plunger comprising a follower board or plate 13 having at its ends upwardly extending guide arms or fingers 14 to engage the end walls 5 and prevent tilting movement or motion of the plunger beyond a determined degree as it reciprocates. The board 13 is provided with upwardly extending rods 15 which slide vertically in openings in a plunger-carrying frame formed of a pair of cross bars 16 and a longitudinally extending bridge piece 17 centrally connecting said bars, the said rods 15 being movable in the bars 16 to permit vertical adjustment of the follower board and to guide it in its movements.

Fixed to the follower board at its lower end is a screw 18 which passes loosely through an opening in the bridge bar 17 and carries at its upper end an adjusting nut 19 whereby it may be raised or lowered to adjust the follower board or acting surface of the plunger whereby the latter may be vertically set or adjusted to regulate its stroke or degree of movement toward the wall 4 for compressing the material to different degrees of thickness or density.

Pivoted to the follower-carrying frame are crank arms or links 20 which are connected with the crank portion of a shaft 21, the ends of which are journaled in suitable bearing openings in the upper extended ends of the walls 2 and carrying pinions 22. Each of these pinions meshes with an idler 23 which meshes with a second idler 24 receiving motion from a pinion 25 fixed to the shaft, on one end of which is a drive pulley 26 loosely mounted on one end of a drive shaft 27 journaled in bearings 28 on one side of the machine. The pulley 26 is adapted to be driven by a belt from any suitable source of power and has a conical friction surface adapted to be engaged by a friction clutch disk or member 29 feathered to slide upon and rotated with the shaft, by which the pulley may be fixed to the shaft to communicate motion thereto or allowed to have rotary motion on the shaft without driving the same. A shifting lever 30 is pivotally connected with the clutch disk 29 and pivotally mounted upon a bracket arm 31 extending from the frame of the machine so that by moving said lever in one direction or the other, the clutch disk may be thrown into and out of engagement with the pulley to throw the gearing operating the shaft 21 into or out of operation at will. One of the side pieces 3 extends above the other and is provided with a feed slot or opening 32 through which the hops or other material may be introduced into the hopper, beneath the plunger when the latter is elevated.

In order to facilitate the feed of the material, an inclined chute 33 may be mounted upon the extended portion of the higher side piece 3 and detachably fastened thereto in any preferred manner, as by means of hooks 34 on the chute engaging staples or eyes 35 on the side piece. The body of the chute inclines outwardly and upwardly so that the material may be conveniently introduced. Pivotally mounted upon the shorter side piece 3 is a latch or holding device 36 having a handle and an engaging end, the latter adapted to enter a groove or recess 37 in the adjacent side of the bottom of the plunger, whereby the latter may be swung on the links 20 to rest upon the upper edge of said side piece and be secured in elevated position during the operation of removing the formed bale.

In the operation of the apparatus, the baling chamber is closed, the plunger elevated to the position shown in Fig. 1, and a sufficient amount of material introduced into the hopper for compression. This material falls by gravity through the hopper into the baling chamber and after a sufficient amount has been supplied, the driving shaft is thrown into operation to force the plunger downward to compress the material. The drive gearing is kept in operation until the plunger is elevated, when it is thrown out of operation to hold the plunger elevated, when another quantity of the material is fed into the baling chamber and compressed by a subsequent downward movement of the plunger and this operation is repeated until a bale of the desired size and density is formed. The bale may then be bound in any suitable manner and removed by detaching one or both of the doors 9. In forming bales of hops, it is preferable to place sections of cloth upon the bottom 4 of the baling chamber and upon the top of the bale before final compression, and while the material is still held compressed by the plunger the doors 9 are detached, the edges of the cloth stitched together to hold the bale compressed, the plunger then elevated and the bale removed.

From the foregoing description, the construction and mode of operation of my improved baling press will be readily understood and it will be seen that a press of simple construction is provided whereby the operation of baling hops and other material may be rapidly and conveniently performed. It will also be seen that the plunger may be adjusted to regulate its compressing stroke so that bales of different thicknesses or density may be produced.

Having thus described the invention, what is claimed, is:—

1. A baling press embodying a baling chamber having an opening for the removal of the formed bail, a closure for said opening, a superposed hopper communicating with said baling chamber, a plunger movable in said hopper and chamber, gearing for driving the plunger, and means for regulating the effective stroke of the plunger.

2. A baling press embodying a baling chamber having an opening for the removal of the formed bale, a closure for said opening, a superposed hopper, a vertically movable plunger, a crank shaft for operating said plunger, means for regulating the effective stroke of the plunger, and gearing for driving said shaft.

3. A baling press embodying a baling chamber having an opening for the removal of the formed bale, a superposed hopper, a crank shaft disposed above the hopper, a plunger-carrying frame connected with said shaft, a plunger vertically adjustable on said frame, means connecting the frame and plunger for adjusting the latter, and gearing for driving the shaft.

4. A baling press embodying a baling chamber open at its sides, doors for closing said sides, fastenings for holding the doors in closed position, a superposed hopper, a crank shaft arranged above the hopper, a plunger operated by said shaft and having a pivotal connection therewith, and a catch upon the frame adapted to engage and hold the plunger in an elevated position.

5. A baling press embodying a baling chamber, a hopper communicating therewith, a crank shaft, a plunger-carrying frame operated by the shaft, a plunger embodying rods slidably connected with the frame, a screw fixed to the plunger and extending loosely through the carrier frame, a nut engaging the screw for adjusting the plunger relative to the carrier frame, and means for driving the shaft.

In testimony whereof I affix my signature in presence of two witnesses.

FRED NEWTON.

Witnesses:
  ALLIE ENGLE,
  BLAINE McCORD.